United States Patent Office 2,767,217
Patented Oct. 16, 1956

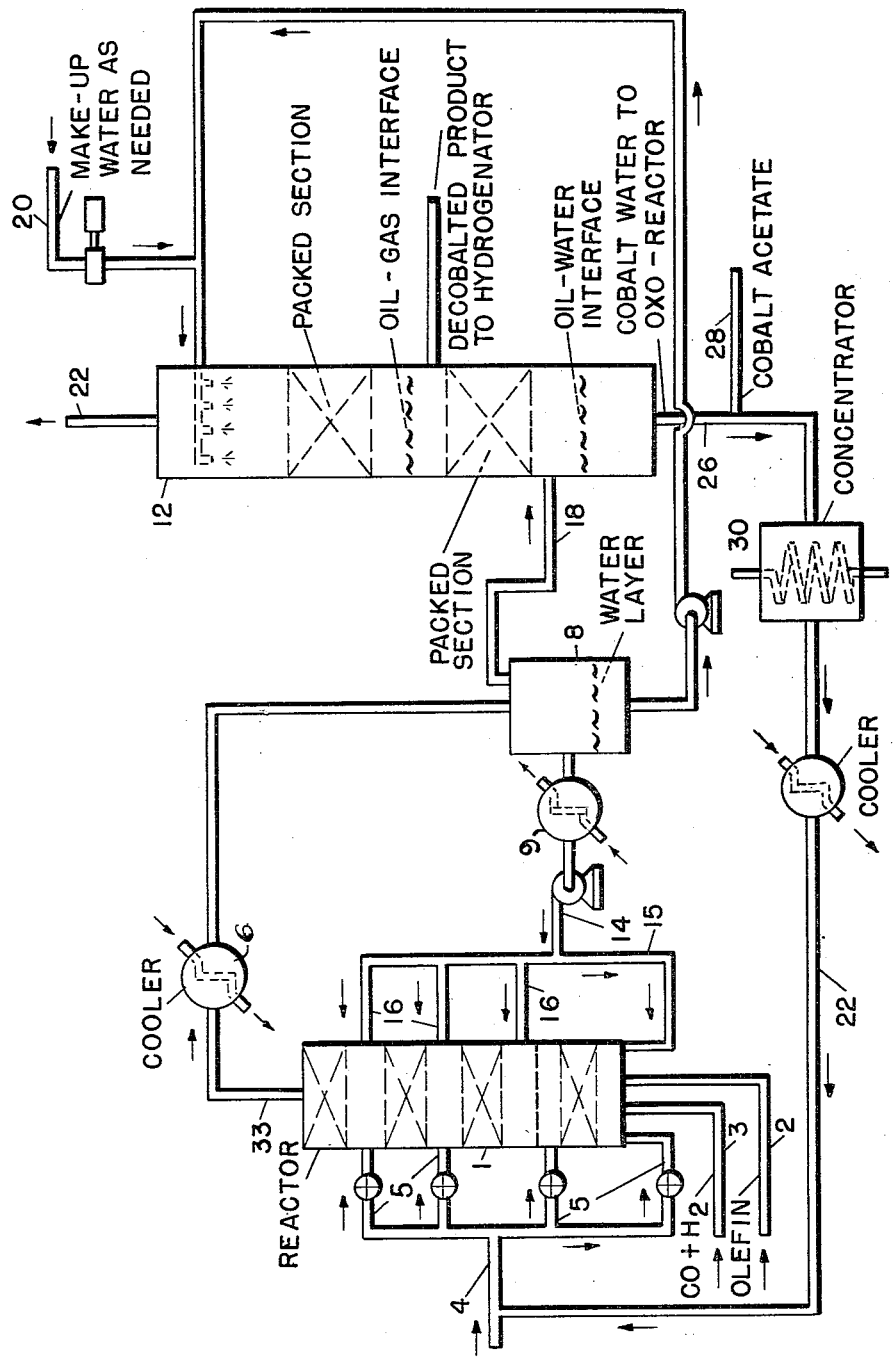

2,767,217

COBALT CARBONYL REMOVAL AND RECYCLE IN OXO SYNTHESIS

James E. Moise and Joseph K. Mertzweiller, Baton Rouge, La., assignors to Esso Research and Engineering Company, a corporation of Delaware Application January 9, 1953, Serial No. 330,386

9 Claims. (Cl. 260—604)

The present invention relates to the preparation of organic compounds by the reaction of carbon monoxide and hydrogen with carbon compounds containing olefinic linkages in the presence of carbonylation catalyst. More specifically, the present invention relates to the removal and recovery of the cobalt catalyst utilized in the foregoing reaction from the product of the first stage of the cobalt carbonylation reaction for further use in the process. The invention still further relates to the successful employment of water-soluble catalyst in the continuous reactions.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and the molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins and diolefins such as propylene, butylene, pentene, hexene, heptene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalyst in the first stage of the prior art processes is usually added in the form of salts of the catalytically active metal with high molecular fatty acids, such as stearic, oleic, palmitic, naphthenic, etc., acids. Thus, suitable catalysts are, for example, cobalt oleate or naphthenate. These salts are soluble in the liquid olefin feed and may be supplied to the first stage as hydrocarbon solution or dissolved in the olefin feed. Also, water-soluble catalysts have been suggested, as well as slurries of oil- and water-insoluble forms of cobalt.

The synthesis gas mixture fed to the first stage may consist of almost any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g., and at temperatures in the range of about 150–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture and it is to this stage as well as to the first stage, that the present principal invention applies.

From the catalyst removal zone, the reaction products, comprising essentially aldehydes, may be transferred to a hydrogenation zone, and the products reduced to the corresponding alcohols in a manner known per se, under reaction conditions of pressure and temperature similar to those obtaining in the carbonylation stage. Thus, pressures of the order of 2000–3500 p. s. i. g. and hydrogenation temperatures in the range of 350–550° F. may be employed in conjunction with catalysts such as nickel, copper, cobalt, their compounds, molybdenum sulfide, tungsten sulfide, and the like.

One of the problems involved in the aldehyde synthesis reaction is the fact that the catalyst metal, such as cobalt, though added as an organic salt, reacts with carbon monoxide under the synthesis conditions to form the metal carbonyl and hydrocarbonyl. There is basis for the belief that the metal hydrocarbonyl itself is the active form of the catalyst. This dissolved catalyst must be removed prior to the subsequent hydrogenation, as otherwise it would separate out on the hydrogenation catalyst, plug transfer lines and heat exchangers, etc. The carbonyl remains dissolved in the reaction product from the primary carbonylation stage and is therefore removed in the catalyst removal, or decobalting zone.

One way to remove the cobalt is by a thermal method wherein the acrued product in the first stage is heated to a temperature of from about 300–350° F. Conveniently, a steam coil immersed in the liquid to be decobalted is employed. A pressure of from about 100–175 p. s. i. g. is maintained in the decobalting zone by the injection of a gasiform material, such as hydrogen, an inert vapor, etc., whereby the CO partial pressure is maintained at a relatively low value in the decobalting zone. Periodically, it is necessary to take the decobalter off stream to remove accumulated metallic cobalt to prevent plugging of feed lines and adjacent areas of the decobalting vessel. Furthermore, cobalt metal deposits as a film on the heating means and requires constant removal to prevent plugging of the pretreating equipment and surfaces. The removal of these films and deposited cobalt metal is a tedious and difficult process and adds significant cost to the economics of the carbonylation reaction. Furthermore, thermal decobalting usually did not completely remove soluble cobalt from the aldehyde product, and as much as 500 parts per million of cobalt, and even higher, were frequently left in the feed to the hydrogenation plant.

It is the principal object of the present invention to describe a novel method of removing and recovering dissolved cobalt from the aldehyde product obtained by oxonation of olefins with CO and $H_2$ in the presence of a cobalt catalyst.

It is a further object of the present invention to set forth a process for recovering extremely active forms of cobalt catalyst from the decobalting stage and to recycle this active catalyst to the primary reactor.

It is a still further purpose of the present invention to decobalt aldehyde product without subjecting the latter to reactive chemicals or to prolonged exposure to elevated temperatures.

A still further object is to provide an efficient high pressure decobalting system which will allow the decobalted aldehyde to pass directly to the hydrogenation stage and thus eliminate costly high pressure pumps.

A still further object of the present invention is to provide efficient cooling for said primary reaction stage.

Other and further objects and advantages of the invention will be in part evident and will in part appear hereinafter.

These objects and advantages may, in brief compass, be achieved by treating the cobalt containing aldehyde product at high pressures of about 2000 to 3500 p. s. i. g. with liquid water. The temperature of the treatment preferably is less than 350° F. and may be as low as 100° F. Under these conditions, by a series of extraction stages, the aldehyde product is substantially completely freed of dissolved cobalt, which is recovered as a water soluble material rather than as a solid. Furthermore, the extraction is carried out under substantially the same pressures existing in the carbonylation zone, and in the presence of H₂ and CO. Under these conditions, it has been discovered that a cobalt carbonyl is recovered in the water extract in anionic form, principally as the

ion. This form of cobalt is the active species of the catalyst, and may be utilized in the carbonylation reactor directly without prior conversion into the carbonyl.

In accordance with the present invention, therefore, cobalt-contaminated aldehyde product withdrawn from the carbonylation stage is passed to a high pressure separator, as in conventional operation, and a portion of the undecobalted product recycled to the primary stage. Both the gas and the aldehyde product are then passed into a high pressure decobalting unit wherein they are scrubbed countercurrently with water under the conditions of temperature and pressure previously described. The water extract, preferably after treatment as described below, is passed to the aldehyde synthesis zone to provide at least a portion of the catalyst requirements therefore. The aldehyde product substantially completely free of dissolved cobalt, may then be recovered as such or be further processed and converted to alcohol in a manner known per se.

The present invention will best be understood from the more detailed description hereinafter wherein reference will be made to the accompanying drawing, which is a schematic representation of a system suitable for carrying out a preferred embodiment of the invention.

Turning now to the drawing, an olefinic hydrocarbon having one carbon atom less than the number of carbon atoms in the desired resulting oxygenated compound and preferably alkali washed prior to reaction is fed through feed line 2 to the bottom portion of primary reactor 1. Reactor 1 comprises a reaction vessel which may, if desired, be packed with non-catalytic material such as Raschig rings, porcelain chips, ceramic material, pumice and the like. Reactor 1 may be divided into discrete packed zones separated by any suitable means such as support grids, etc., or it may comprise but a single packed zone, or it may contain no packing.

The olefinic feed may initially contain dissolved therein 1–3% by weight of cobalt oleate based on the olefin. It is understood that other compounds of cobalt soluble in the olefins may also be used equally effectively. However, it may be desirable initially to employ, instead of an oil-soluble cobalt compound, a compound of cobalt that is water-soluble, such as the acetate, formate, etc. In such case, cobalt may be added in aqueous solution along with the water injected as below. In all events, as the reaction progresses, oil-soluble cobalt, if initially added, may be cut back and all cobalt added as aqueous solution. Simultaneously, a gas mixture containing hydrogen and carbon monoxide in the approximate ratio of 0.5 to 2 volumes of hydrogen per volume of carbon monoxide is supplied through line 3 to primary reactor 1 and flows concurrently through reactor 1 with said olefin feed. Reactor 1 is preferably operated at a pressure of about 2500–3500 p. s. i. g., and at a temperature of from about 250° to 450° F. depending upon the olefin feed and other reaction conditions. The rate of flow of synthesis gases and olefins through reactor 1 is so regulated that the desired conversion level of the olefin is obtained. If it is desired to provide at least a portion of the water required initially for cobalt extraction and subsequent recycle, water or steam may be injected into reactor 1 through line 4 and manifold 5. However, cooling is advantageously supplied by recycle of aldehyde product as shown below. As indicated above, extraneous water addition is preferably cut back as the reaction progresses, and water is recycled from the decobalting system.

The carbonylation reaction in reactor 1 is achieved without external cooling means such as by tubes or coils but the cooling and temperature control are carried out as indicated below. Liquid oxygenated reaction products containing catalyst in solution, water and unreacted synthesis gases are withdrawn from an upper portion of high pressure reactor 1 and are transferred through line 33 to cooler 6, and from thence via line 7 to high pressure water-oil separator 8. Cooler 6 functions as the principal means of controlling temperature in the subsequent extraction. In zone 8 separation into a lower aqueous and an upper organic layer occurs. A partition of cobalt carbonyl and hydrocarbonyl formed in reactor 1 also takes place, the bulk of the carbonyl remaining in the upper aldehyde layer and a portion being dissolved in the lower aqueous layer.

A stream of aldehyde product containing dissolved therein substantial quantities of cobalt carbonyl is withdrawn from settling zone 8 and is recycled through lines 14 and 15, through cooler 9, and manifold injector 16 to reactor 1. It is advantageous to supply this liquid to a bottom portion of this reactor as well as to the upper zones, particularly when aqueous solutions of catalyst are supplied downstream, for thus cobalt carbonyl, the active form of catalyst, is provided in the lowest zone. The amount of aldehyde recycled is a function of the amount of cooling required in reactor 1, the temperature gradient throughout the reactor being in the range of from about 30°–100° F., and the cooled aldehyde product from settler 8 being at a temperature level 200–250° F. lower than in reactor 1.

In accordance with the present invention, the aqueous layer in separator 8 is pumped via line 10 to the upper portion of high pressure decobalting unit 12. The latter is a packed tower containing discrete beds of packing, to afford intimate gas-liquid and liquid-liquid contact. The upper cobalt-contaminated aldehyde layer from separator 8 is passed via line 18 into the lower portion of tower 12. Also, dissolved and unreacted gases, consisting essentially of H₂ and CO are also passed with the aldehyde product into the lower portion of tower 12, and pass upwardly, countercurrent to the stream of descending water. Conditions in tower 12 include pressures of about 2000 to 3500 p. s. i. g. and temperatures below about 350° F., preferably in the range of 200 to 300° F. The throughput rates are adjusted to maintain separate oil-gas and oil-water interfaces and the ratio of water to aldehyde product may be as high as 1:1. By the process of the present invention, the same scrubbing medium is thus used to remove cobalt carbonyl both from the gaseous and the liquid (i. e. oil) phase. As required, additional or make-up water may be added through line 20.

The aldehyde product now substantially completely depleted or dissolved cobalt is withdrawn through line 24 and may be passed directly to the hydrogenation stage without depressuring. Synthesis gases are withdrawn through line 22 for recycle.

From the lower portion of vessel 12 there is withdrawn the aqueous layer containing in solution the Co(CO)$_4^-$ ion. The cobalt content of this solution is relatively low and its direct recycle to the aldehyde synthesis stage is not desirable because the relatively large amount of water tends to flood the reactor. It has been found, however, that when a cobalt salt is added to the water, a reaction occurs wherein the very water soluble cobalt salt is formed, in accordance with the reaction

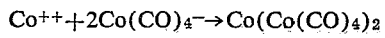

$$Co^{++} + 2Co(CO)_4^- \rightarrow Co(Co(CO)_4)_2$$

This compound, which contains the cobalt anion in its active form, i. e. as the carbonyl, has been found to be exceptionally and surprisingly heat stable, while cobalt hydrocarbonyl itself is very heat and air-sensitive. Accordingly, the water layer withdrawn from reactor 12 through line 26 is preferably treated with a stoichiometric amount of a cobalt salt, such as cobalt acetate. This provides a novel and very satisfactory means of introducing make-up cobalt. The solution is then passed to a concentration zone 30 wherein the cobalt concentration of the aqueous solution is brought up to about 2 to 7%. This may be done even at atmospheric pressures without significant decomposition of the cobalt anion. The aqueous solution may be cooled and is pumped as needed through lines 22, 4 and manifold 5 into the aldehyde synthesis reactor 1.

The invention may be further illustrated by the following specific examples of laboratory experiments employing high pressure water extraction of cobalt from aldehyde product in the presence of H$_2$ and CO.

*Example I*

A batch oxonation was carried out in a stainless steel shaker autoclave employing 358 gms. of a C$_7$ fraction of propylene-butylene polymer containing 0.77 gm. of cobalt in solution as cobalt oleate. At a reaction temperature of 300° F. an induction period of 1.5 hours was observed and this was followed by a fairly rapid absorption of synthesis gas, the pressure decreasing from 3000 p. s. i. g. to 2000 p. s. i. g. in about 45 minutes.

After gas absorption was complete the contents were cooled below 100° F., depressured and 500 ml. of water added. The autoclave was purged with synthesis gas to remove any air, pressured to 2000 p. s. i. g. with synthesis gas, and heated to 225° F. Extraction was carried out by shaking for 2 hours at 225° F. during which time the pressure was 2600 p. s. i. g. of synthesis gas and there was no detectable gas absorption. The autoclave was then cooled below 100° F., depressured and discharged, special care being taken to keep the aqueous layer from contact with air.

The aldehyde layer was recharged to the autoclave and subjected to a second extraction with 500 cc. of water at 300° F. and 2700 p. s. i. g. synthesis gas pressure for 2 hours.

The aqueous layers from both extractions were analyzed by electrometric titration and found to contain the following types and amounts of cobalt:

| Aqueous Layer | 1st Extraction | 2nd Extraction |
|---|---|---|
| Total Cobalt, Gms | 0.36 | 0.38 |
| Anionic Cobalt, Gms | 0.27 | 0.25 |
| Cationic Cobalt, Gms | 0.09 | 0.13 |

Thus, on the basis of composition of the aqueous phases, a total of 0.74 gram of cobalt or about 96% of the cobalt charged was removed by the two extractions. The aldehyde layer from the second extraction was found to contain 0.016% cobalt.

*Example II*

This example is designed to illustrate the manner in which aqueous solutions, containing cobalt principally as the hydrocarbonyl, may be concentrated to provide catalyst solutions for recycle.

A volume of 400 ml. of the aqueous layer from the second extraction described in Example I above was mixed with 2 ml. of a cobalt acetate solution (cobalt concentration 0.0784 gm./ml.) and the mixture evaporated on the hot plate to a total volume of 25 ml., care being taken to avoid contact with air. The total cobalt charged to the concentration was 0.48 gram and the recovery in the concentrate was 0.44 gram or 93% of that charged. The actual concentration of cobalt in the concentrate was about 1.7% cobalt.

*Example III*

A batch oxonation in a stainless steel shaker autoclave employed 500 ml. of a C$_7$ fraction of a propylene-butylene polymer and 3.2 grams of cobaltous acetate hexahydrate, the latter being equivalent to 0.76 gram of cobalt. At a reaction temperature of 325° F., the induction period was complete in less than 15 minutes and gas absorption was complete (2000–3000 p. s. i. g.) in about one hour additional.

The contents of the autoclave were cooled below 100° F., depressured and 500 ml. of water added. The autoclave was purged with synthesis gas to remove air, pressured to 2000 p. s. i. g. with synthesis gas and heated to 225° F. The vessel was shaken for two hours during which time the pressure was steady at 2600 p. s. i. g., there being essentially no gas absorption. The autoclave was cooled below 100° F. depressured and discharged. The aldehyde portion was recharged to the autoclave and subjected to a second extraction with 500 ml. of water at 225° F. and 2700 p. s. i. g. synthesis gas pressure.

Analysis of the aqueous layers showed the following types and amounts of cobalt:

| Aqueous Layer | 1st Extraction | 2nd Extraction |
|---|---|---|
| Total Cobalt, Gms | 0.37 | 0.33 |
| Anionic Cobalt, Gms | 0.28 | 0.27 |
| Cationic Cobalt, Gms | 0.09 | 0.06 |

Analysis of the aldehyde layer showed 0.054 wt. percent cobalt.

These examples are merely to illustrate the principles and the technique of the invention. In commercial adaptations, for example, it is desirable to achieve better cobalt removal than the 0.01–0.05% residual cobalt shown in the examples. This is achieved by use of a more efficient extraction system and by a greater number of extraction stages than was used in the small scale experiments. A single high pressure vessel may serve as the liquid-gas separator as well as the extraction vessel. Temperatures of about 300° F. in the extraction stage are indicated to be more effective than lower temperatures.

These examples demonstrate the principles and techniques of the present invention, and the fact that water scrubbing at high pressures in the presence of H$_2$ and CO removes cobalt hydrocarbonyl from both gases and liquids, the efficiency of the extraction depending upon the equipment employed.

The process of the present invention may be modified in many directions. Several extraction stages may be operated in series. Also, if desired, the water scrubbing system may be made adjunct to a more conventional decobalting system, to relieve the load on the latter.

What is claimed is:

1. In a continuous carbonylation reaction wherein olefinic carbon compounds are contacted in a carbonylation zone with CO and H$_2$ in the presence of a cobalt carbonylation catalyst at elevated temperatures and pressures to produce aldehydes, and wherein a solution comprising said aldehydes and dissolved cobalt catalyst is transferred to a catalyst removal zone and said cobalt is removed from said aldehyde product, an improved method of removing and recovering said cobalt from said aldehyde product which comprises contacting said cobalt-contaminated aldehyde product with liquid water in said catalyst removal zone, maintaining a temperature of less than about 350° F. and a pressure of from 2000–3500 p. s. i. g., in said zone, scrubbing said aldehyde product with said liquid water in the presence of $H_2$ and CO, recovering an aqueous solution of a cobalt carbonyl from said zone, and withdrawing an aldehyde product substantially depleted of cobalt from said catalyst removal zone.

2. The process of claim 1 wherein a temperature of from about 100–350° F. is maintained within said cobalt removal zone.

3. The process of claim 1 wherein said aqueous cobalt is passed to said carbonylation zone to supply at least a portion of the catalyst requirements of said zone.

4. The process of claim 3 wherein said aqueous solution is concentrated prior to passing said solution to said carbonylation zone.

5. The process of claim 1 wherein decobalted aldehyde product is passed without depressuring to a hydrogenation zone.

6. In a corbanylation process wherein olefinic carbon compounds are contacted in a carbonylation zone with $H_2$ and CO in the presence of a cobalt catalyst at elevated temperatures and at pressures of about 2500–3500 p. s. i. g. to produce reaction products comprising aldehydes, and wherein a solution comprising said reaction product and dissolved cobalt catalyst is transferred to a catalyst removal zone, and decobalted aldehyde product hydrogenated to the corresponding alcohol, the improvement which comprises maintaining substantially similar pressures in said carbonylation, catalyst removal and hydrogenation zones, scrubbing said cobalt-contaminated aldehyde product with liquid water at a temperature not higher than about 350° F., at a pressure in the range of about 2000 to 3500 p. s. i. g., scrubbing said aldehyde product in the presence of $H_2$ and CO, and recovering an aqueous solution of a cobalt carbonyl from said catalyst removal zone.

7. The process of claim 6 wherein a separate cobalt-containing gas stream withdrawn from said carbonylation zone is scrubbed with water at high pressure.

8. The process of claim 7 wherein the same high pressure water scrubs both said gas stream and said liquid stream withdrawn from said carbonylation zone.

9. The process of claim 4 wherein cobaltous ion is added to said aqueous solution prior to concentration.

References Cited in the file of this patent

UNITED STATES PATENTS

| | | |
|---|---|---|
| 2,557,701 | Smith | June 19, 1951 |
| 2,595,096 | Parker | Apr. 29, 1952 |

FOREIGN PATENTS

| | | |
|---|---|---|
| 660,737 | Great Britain | Nov. 14, 1951 |